(12) United States Patent
Takahashi et al.

(10) Patent No.: US 7,383,859 B2
(45) Date of Patent: Jun. 10, 2008

(54) MAIN STEAM VALVE FOR A STEAM TURBINE

(75) Inventors: Makoto Takahashi, Kanagawa-ken (JP); Osamu Shindo, Kanagawa-ken (JP); Atsushi Narabe, Tokyo (JP); Hideaki Miyayashiki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/175,284

(22) Filed: Jul. 7, 2005

(65) Prior Publication Data

US 2006/0005889 A1    Jan. 12, 2006

(30) Foreign Application Priority Data

Jul. 7, 2004    (JP) ............... 2004-200640

(51) Int. Cl.
   *F16K 1/52*    (2006.01)
(52) U.S. Cl. .................. 137/625.33; 137/630.14
(58) Field of Classification Search .......... 137/625.3, 137/625.33, 625.37, 630.14
See application file for complete search history.

(56) References Cited

U.S. PATENT DOCUMENTS 3,141,476 A * 7/1964 Davis et al. .......... 137/630.14
4,066,100 A    1/1978 Schwarz
4,315,526 A    2/1982 Ohtomo
5,014,746 A * 5/1991 Heymann ............. 137/625.3
5,870,896 A * 2/1999 Clark et al. ............... 60/670
6,926,032 B2 * 8/2005 Nawaz ................ 137/625.33

FOREIGN PATENT DOCUMENTS

| JP | 55-064405 U | 5/1980 |
| JP | 57-151006 A | 9/1982 |
| JP | 61-057442 B2 | 12/1986 |
| JP | 03-003045 B2 | 1/1991 |

* cited by examiner

*Primary Examiner*—John Fox
(74) *Attorney, Agent, or Firm*—Foley & Lardner LLP (57) ABSTRACT

A main steam valve with improved flow characteristic and enhanced reliability comprises a valve seat, a main valve body, and a bypass valve body. A side surface of the bypass valve body slidably fits into the inner surface of the main valve body and forms a steam inlet comprised of a plurality of rows of inlet openings arranged along the side surface. The openings are diametrically symmetrically arranged in the bypass valve, and the positions of the openings in each of the rows are shifted from the positions of openings in the next row.

23 Claims, 11 Drawing Sheets

MAIN STEAM VALVE FOR A STEAM TURBINE

CROSS REFERENCE TO RELATED APPLICATION

This application is based upon and claims the benefit of priority from prior Japanese Patent Application No. 2004-200640, filed on Jul. 7, 2004, the entire contents of which are incorporated herein by reference.

FIELD OF THE INVENTION

This invention relates to a steam turbine, and in particular to a main steam valve which includes a bypass valve.

BACKGROUND

Conventional steam turbines have two types of steam valves. One is a main steam valve (also referred to as "main stop valve"). The other is a governing valve.

Both of the valves are provided at an upstream side of the steam turbine. The function of the main steam valve is to shut down steam flow to the turbine. The governing valve, which is provided at a downstream side of the main steam valve, controls the flow rate of steam introduced into the turbine during the operation.

When starting up a steam turbine for a power plant, such as a thermal power plant or a nuclear power plant, a warming up operation is usually necessary to prevent turbine components from being subjected to high stress due to sudden exposure to the high temperature steam generated at the steam generator. This is also true for the governing valve.

When warming up the governing valve during the warming up operation, which is typically until an initial load operation, the main steam valve controls the flow rate of the steam. For this reason, some conventional steam turbines have a main steam valve that also functions to control the flow rate of steam. This function is accomplished by installing a bypass valve inside of the main steam valve.

Figure 8:
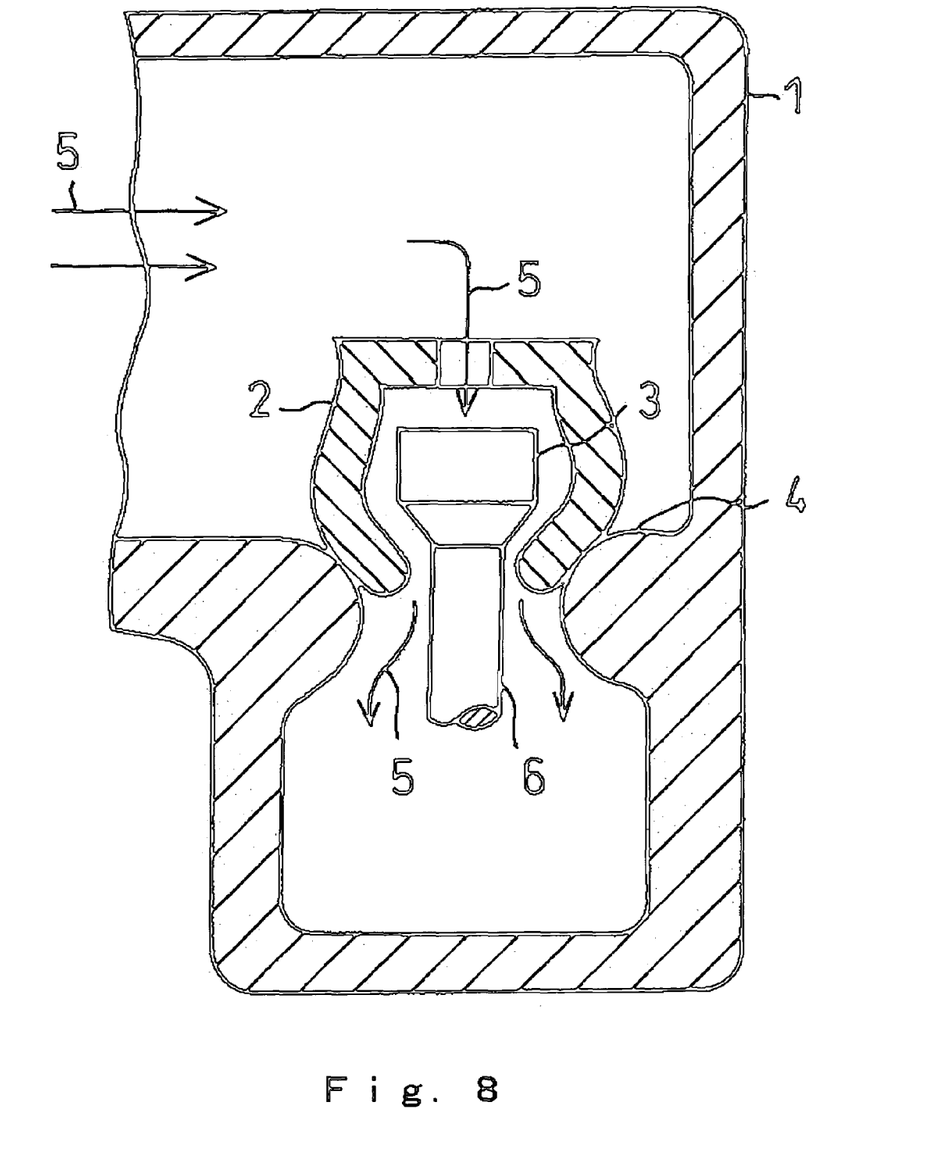
FIG. 8 is a schematic sectional view showing a conventional main steam valve having a bypass valve inside.

FIG. 8 is a schematic sectional view showing a conventional main steam valve having a bypass valve inside. In FIG. 8, a valve chamber 1 contains a main valve body 2, and a bypass valve body 3. The main valve seat 4 cooperates with the main valve body 2. A bypass steam flow 5 occurs when bypass valve rod 6 moves downwardly to open the connected bypass valve body 3.

As shown in FIG. 8, bypass valve body 3 is installed in the main valve body 2. During the warming up operation, main valve body 2 fits in the main valve seat 4 and shuts off the steam flow between the main valve body 2 and main valve seat 4. The main valve has a hollow recess in its inside, and the bypass steam flow 5 goes through this recess. The bypass valve body 3 is provided inside the hollow recess. The inner surface of the main valve body 2 serves as a valve seat for the bypass valve. Therefore, the flow rate of the steam flow 5 can be controlled by moving the bypass valve rod 6 up or down along its axial direction.

However, when controlling the steam flow rate by the bypass valve during the warming up operation, since the flow rate necessary may be relatively small, the flow velocity of the steam flow 5 that passes the bypass valve may be very high. The high velocity steam passing through the bypass valve can cause erosion on the bypass valve body 3 or on the bypass valve rod 6, due to a very small amount of oxidants or drains (waterdrops) which may be included in the steam flow 5. When this erosion becomes too severe, it may cause breakage of the bypass valve body 3 or bypass valve rod 6.

Figure 9:
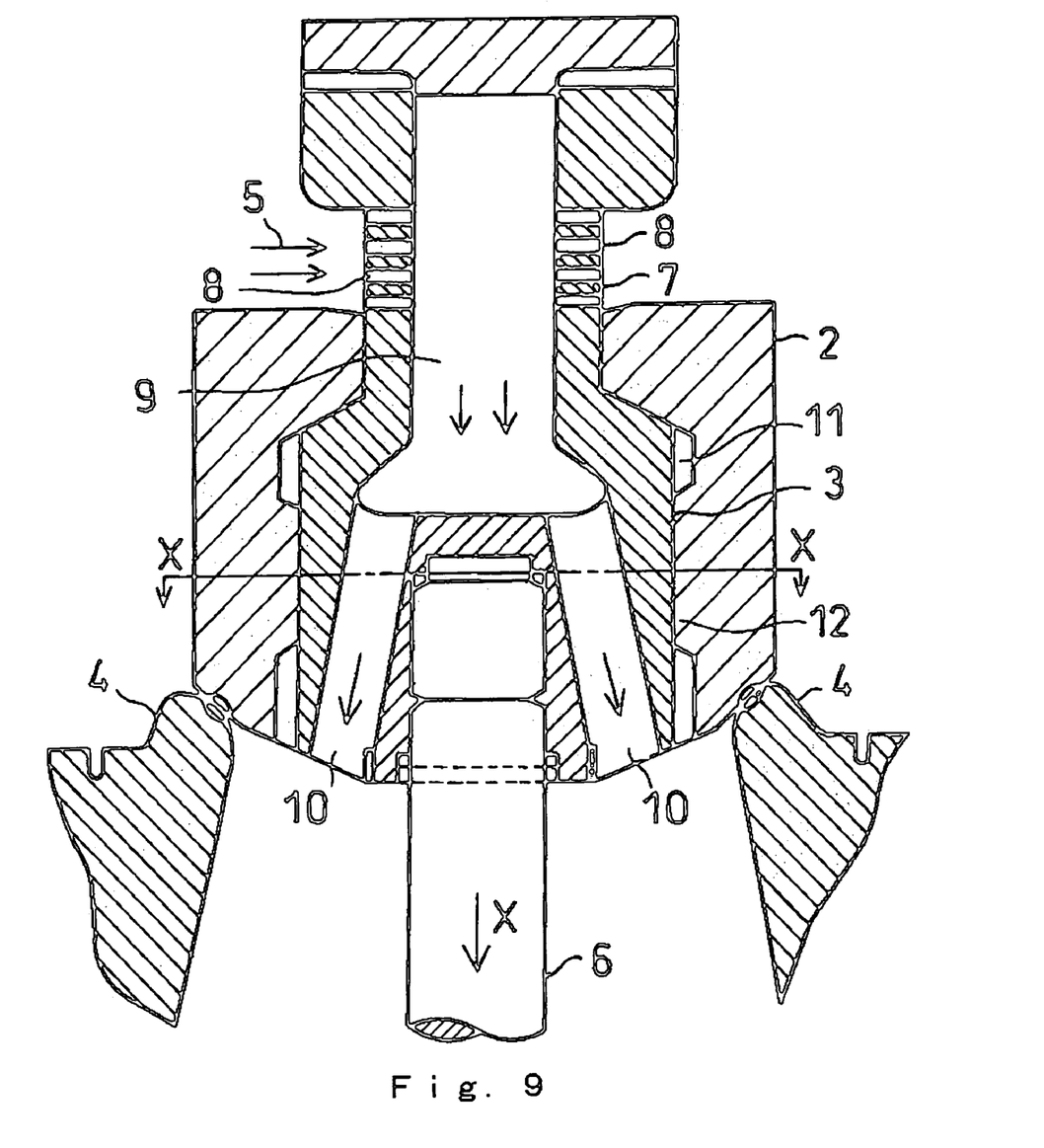
FIGS. 9 and 10 are schematic sectional views showing another conventional main steam valve.
Figure 10:
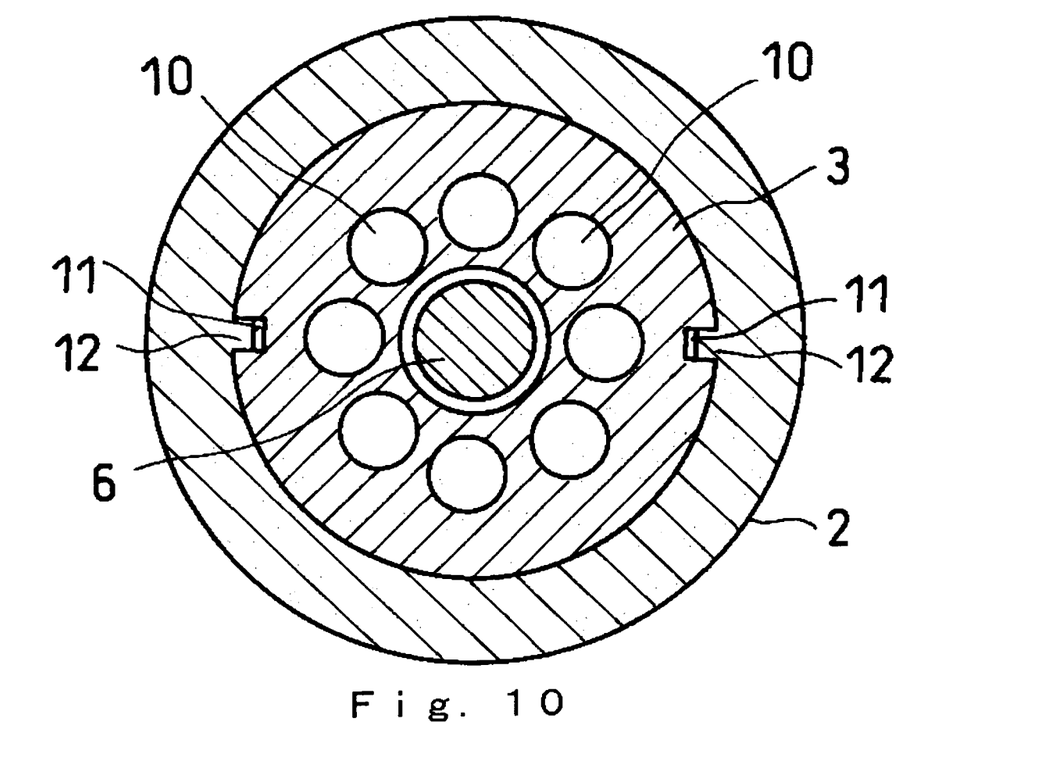

Conventional main steam valves, which are improved to deal with these problems, are described in Japanese Patent Publication (Kokai) No. 57-151006. FIGS. 9 and 10 are schematic sectional views showing this type of modified conventional main steam valve.

As shown in FIGS. 9 and 10, the main valve comprises a main valve body 2 and a main valve seat 4. The main valve body 2 has a substantially cylindrical shape. The main valve seat 4 is coaxially aligned with the main valve body 2, so that the outer surface of the main valve body 2, particularly at its bottom portion, can fit into the valve seat 4. In FIG. 9, the outer side of the main valve seat 4 (substantially upper portion of the main valve seat 4) is the upstream side of the flow, and the inner side of the main valve seat 4 (lower portion of the main valve seat 4) is the downstream side.

The bypass valve body 3 is installed in the main valve body 2, e.g., coaxially in the main valve body 2. A bypass valve rod 6 is connected to the bypass valve body 3 for moving the bypass valve body 3. Hence, The bypass valve body 3, provided in the main valve body, is movable in the axial direction.

The bypass valve body 3 penetrates through the main valve body 2. In other words, the bypass valve body 3 projects above the main valve body 2 toward the upstream side. A side surface 7 of the bypass valve body 3 fits into the inner surface of the main valve body 2. Bypass valve body 3 has a hollow interior, which forms a steam passageway 9 coaxially inside of the bypass valve body 3. The upper side of the steam passageway 9 is closed, while the lower side is open and forms steam outlet holes 10, which introduce the steam from the steam passageway 9 to the downstream side.

The upper portion of the side surface 7 has a steam inlet 8. The steam inlet 8 comprises a plurality of inlet rows arranged along the side surface 7, with each of the inlet rows comprising a plurality of openings. With this configuration, even though the main valve is shut, steam flow 5 can be introduced into the steam passageway 9 through the steam inlet 8, and then to the downstream side via steam holes 10. FIG. 9 shows the state of the bypass valve when it is fully opened. When it is closed by moving valve rod downwardly, the inlet openings are contained within the main valve body 2 and are thereby closed.

The steam introduced from the steam inlet 8 goes toward the center of the steam passageway 9. When passing through the steam inlet 8, the steam has a high velocity; however, the kinetic energy of the steam is weakened around the center portion of the steam passageway since the steam flow 5 is entering from all sides around the side surface 7. Therefore, the steam in the steam passageway 9 has relatively low velocity in the horizontal direction. Then the steam flow 5 moves downwardly in the steam passageway 9, with a recovery of its pressure, and goes to the downstream side through the steam holes 10.

The flow rate of the steam introduced into the steam passageway 9 can be controlled by adjusting an axial position of the bypass valve body 3. When the bypass valve rod 6 moves downwardly along an arrow X, the side surface 7 is drawn into the main valve body 2. Thus, an area of the steam inlet 8 above the main valve body 2, which is the sum of sizes of the openings of the steam inlet 8 above the main valve body 2, decreases, and the flow rate of the steam also decreases.

On the other hand, when the bypass valve rod 6 moves upwardly, the side surface 7 is pulled out from inside of the main valve body 2. Hence, the area of the steam inlet 8 above the main valve body 2, which is the sum of sizes of the openings of the steam inlet 8 above the main valve body 2, increases, and the flow rate increases.

In FIG. 10, which is a sectional view taken along the line X-X shown in FIG. 9, a keyway 11 is provided on the lower portion of the side surface 7 of the bypass valve. The keyway 11 comprises a groove. A key 12 which is coupled with the keyway is provided on the inner surface of the main valve body 2. The key 12 comprises a projection, fitting with the keyway, which is a groove. The keys 12 and the keyway 11, coupled together, prevent the bypass valve body 3 from rotating around its axis.

Figure 7:
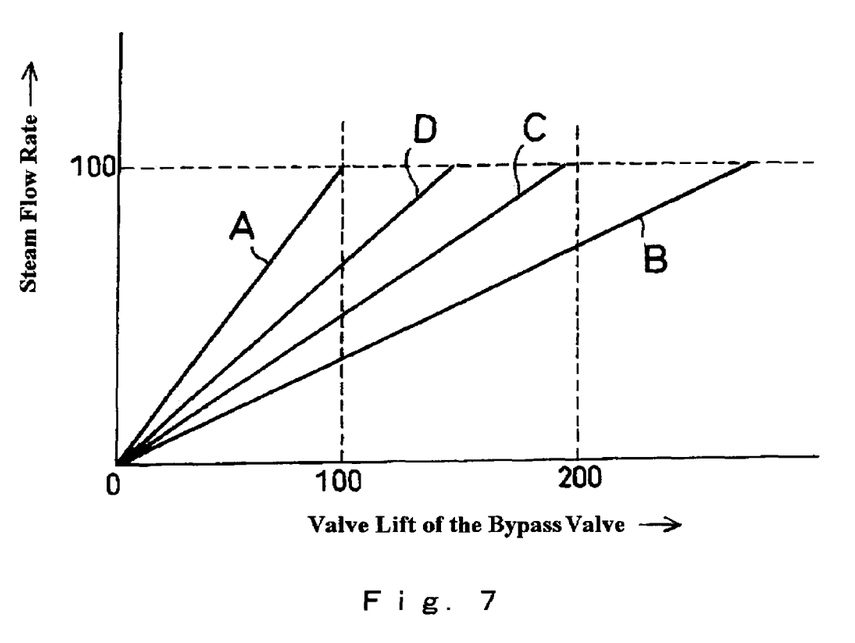
FIG. 7 is a graph showing comparison of flow characteristics of various bypass valves.

FIG. 7 is a schematic graph showing comparison of flow characteristics of various bypass valves. The horizontal axis indicates the degree of valve lift, and the vertical axis indicates the flow rate of the steam. The conventional bypass valve shown in FIG. 8 has the characteristic indicated as A in FIG. 7.

As described above, the flow rate of the conventional bypass valve shown in FIGS. 9 and 10 depends on the sum of the sizes of the openings of the steam inlet 8 positioned above the main valve body 2. Since the steam inlet 8 comprises a plurality of inlet rows, each of which comprises a plurality of openings, arranged along the side surface 7, a significant number of inlet rows arranged along the side surface in the axial direction are needed to ensure that the flow rate is large enough for the bypass valve to properly function. Thus, a larger stroke, which means a larger valve lift, is necessary for the bypass valve shown in FIGS. 9 and 10. This may make the motion of the bypass valve unstable. Further, the size of the main steam valve may need to be enlarged.

The characteristic of the bypass valve shown in FIGS. 9 and 10 is represented by the line B in FIG. 7. As shown in FIG. 7, from the flow characteristic point of view, the conventional bypass valve shown in FIGS. 9 and 10 is inferior to the conventional bypass valve shown in FIG. 8. Even if the conventional bypass valve shown in FIGS. 9 and 10 has twice of the valve lift of the conventional bypass valve shown in FIG. 8, the flow rate of the conventional bypass valve shown in FIGS. 9 and 10 is less than that of the conventional bypass valve shown in FIG. 8.

Since the size of the conventional main steam valve shown in FIGS. 9 and 10 is larger than that of the conventional main steam valve shown in FIG. 8, it may furthermore be difficult to replace the conventional main steam valve shown in FIG. 8 with the modified conventional main steam valve shown in FIGS. 9 and 10. Further, the velocity of the steam around the opening of the steam inlet 8 is still relatively high, and it may cause erosion.

Also, there is another problem with the modified conventional main steam valve that contains two sets of keys 12 and keyways 11. The use of two keys/keyways, which prevent the bypass valve from moving in an unexpected way, are not enough to perform that function. Especially when the bypass valve is fully opened, main valve body 2 vibrates due to the steam flow 5 and may result in wearing of the side surface 8 of the bypass valve and the inner surface of the main valve body 2. The inner surface of the main valve body 2 and the side surface 7 of the bypass valve body 3 have a cylindrical contact surface. Since the area of the cylindrical contact surface is relatively large, it is often a problem that debris becomes lodged in between the gap of the cylindrical contact surfaces. This may obstruct free movement of the surfaces.

SUMMARY OF THE INVENTION

Accordingly, one object of the present invention is to provide a main steam valve with improved flow characteristic as well as enhanced reliability.

In accordance with one aspect of the present invention, there is provided a main steam valve for a steam turbine, comprising a main valve seat; a main valve body having an inner surface, defining a steam passageway, and an outer surface cooperating with the main valve seat, and; a bypass valve body axially slidably arranged in the steam passageway of the main valve body so that a side surface of the bypass valve slidably engages with the inner surface of the main valve body. The side surface comprises a steam inlet that comprises a plurality of rows of inlet openings arranged along the side surface, wherein each of the plurality of inlet openings in each row is diametrically symmetrically arranged in the bypass valve and oriented such that each of the openings introduces steam toward the center of the steam passageway, and wherein positions of the openings in each of the rows are circumferentially offset from the positions of openings in the next inlet row.

In accordance with another aspect of the invention, there is provided a steam turbine including a steam generator, a turbine unit and a main steam valve positioned between the steam generator and the turbine, wherein the main steam valve comprises a steam valve as defined above.

Further features, aspects and advantages of the present invention will become apparent from the detailed description of preferred embodiments that follows, when considered together with the accompanying figures.

DETAILED DESCRIPTION OF THE PREFERRED EMBODIMENTS

The first embodiment in accordance with the present invention is explained with reference to FIGS. 1 to 4.

Figure 1:
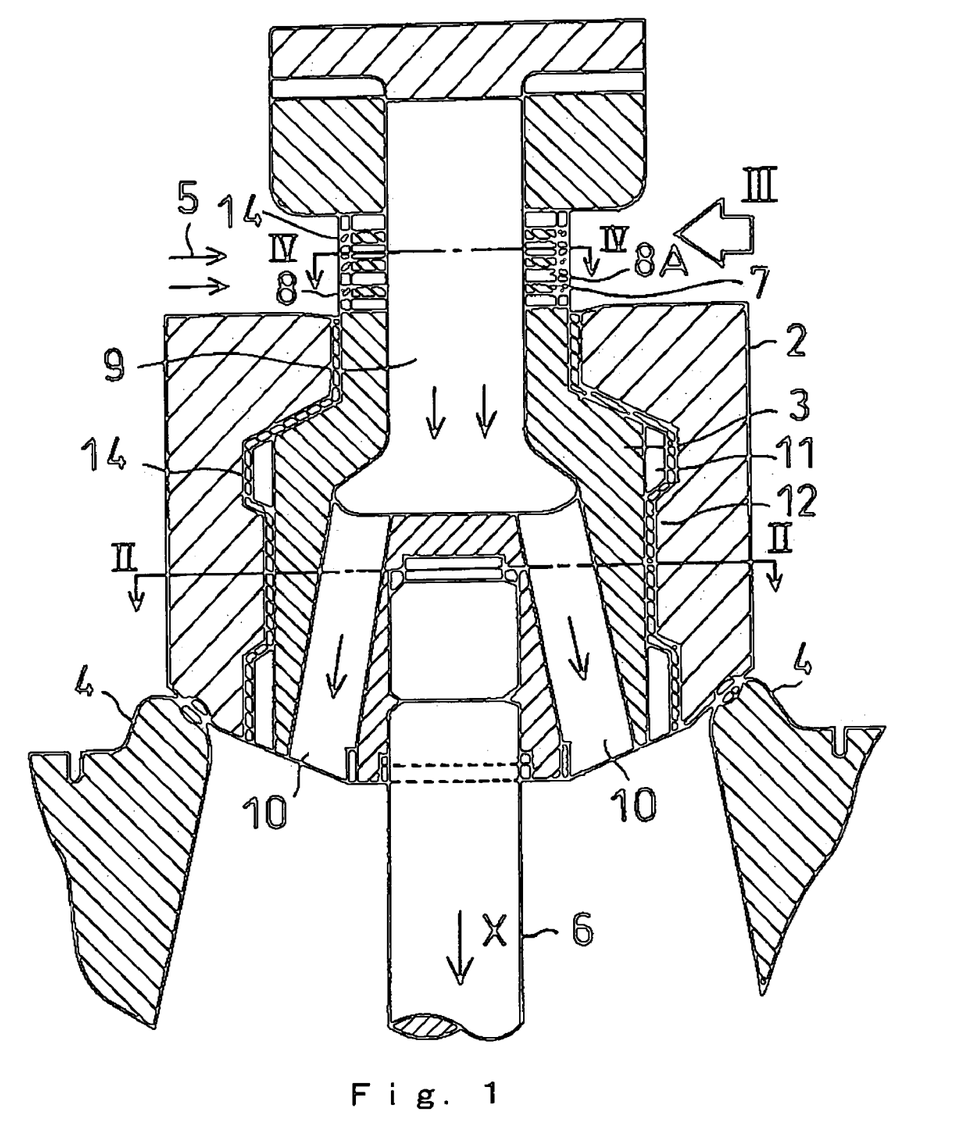
FIG. 1 is a schematic sectional view showing a main steam valve in accordance with a first embodiment of the invention.
Figure 2:
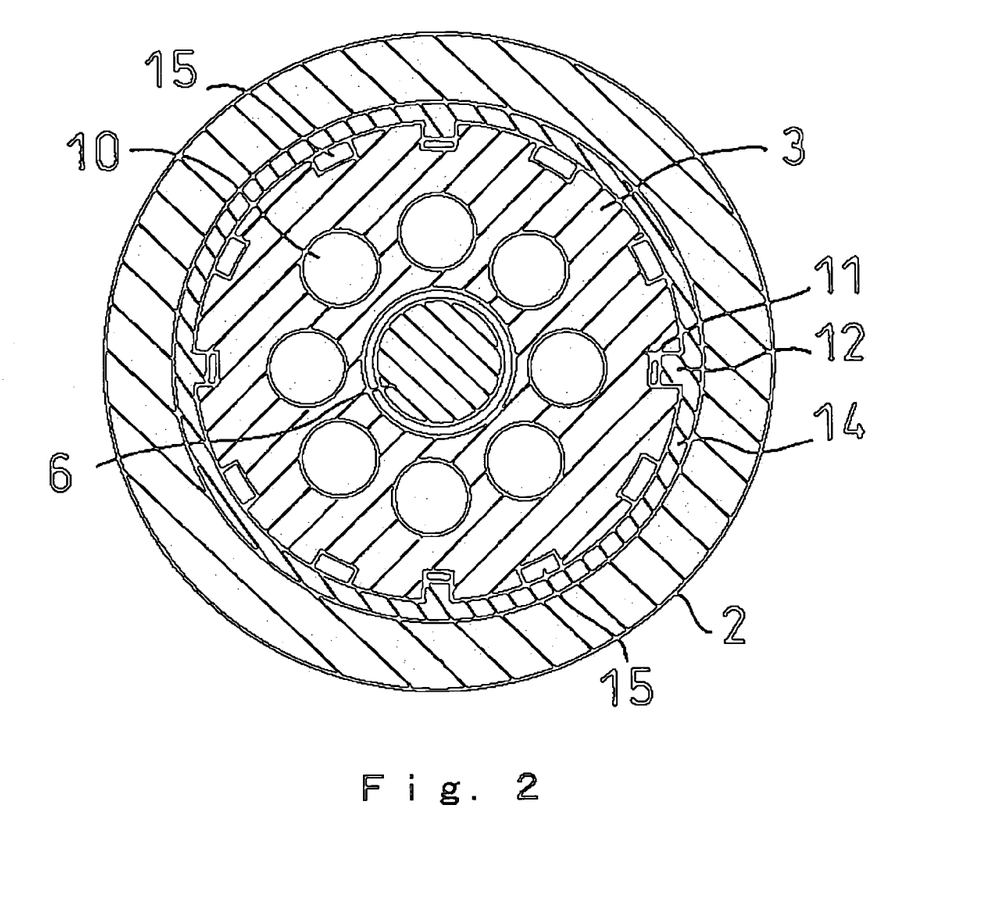
FIG. 2 is a schematic sectional view of the main steam valve, which is taken along II-II line shown in FIG. 1.

FIG. 1 is a schematic sectional view showing a main steam valve in accordance with the first embodiment. FIG. 2 is also a schematic sectional view of the main steam valve, which is taken along II-II line shown in FIG. 1. As shown in FIGS. 1 and 2, a main valve comprises a main valve body 2 and a main valve seat 4. The main valve body 2 has substantially cylindrical shape, which means the valve body has an outer surface and an inner surface, having a portion in which the shape of the cross section about the center axis is substantially circular. The main valve seat 4 is coaxially provided in the main valve body 2. The rim of the bottom part of the outer surface of the main valve body 2 is designed as a sealing surface and seats in the correspondingly shaped main valve seat 4. In other words, the outer surface of the main valve body 2, particularly at its bottom portion, fits or seats in the valve seat 4. In FIG. 1, the outer side of the main valve seat 4 (substantially upper portion of the main valve seat 4) is the upstream side of the flow, and the inner side of the main valve seat 4 (lower portion of the main valve seat 4) is the downstream side.

The bypass valve body 3 is installed in the main valve body 2, preferably coaxially inside of the main valve body 2. Bypass valve rod 6 is connected to the bypass valve body 3, in order to move bypass valve body 3. Hence, the bypass valve body 3, provided in the main valve body, is movable along its axial direction. The bypass valve body 3 penetrates through the main valve body 2. In other words, some part of the bypass valve body 3 projects above the main valve body 2 toward the upstream side. A side surface 7 of the bypass valve body 3 fits into the inner surface of the main valve body 2. Bypass valve body 3 has a hollow opening which forms a steam passageway 9 coaxially provided inside of the bypass valve body 3. The upper side of the steam passageway 9 is closed, while the lower side connects to steam holes 10, which introduce the steam from the steam passageway 9 to the downstream side. The upper portion of the side surface 7 contains a steam inlet 8. The steam inlet 8 comprises a plurality of inlet rows arranged along the side surface 7. Each of the inlet rows comprises a plurality of openings 8A.

The side surface 7 of the bypass valve body 3 has a coating layer 14 on its surface. The coating layer 14 may be cobalt-based alloy, such as Stellite®, which has high anti-wearing and anti-oxidization property. The composition (wt %) of the cobalt-based alloy may be, for example:

Ni: equal or less than 3%, Cr: 28%, W: 4%, Fe: equal of less than 3%, C: 1%, Co: the rest.

Or it may be, for another example:

Ni: 2.5%, Cr: 27%, Mo: 5%, Fe: equal or less than 2%, C: 0.25%, Co: the rest. The inner surface of the main valve body 2, which contacts with the side surface 7 of the bypass valve body 3, may be preferably coated with the same cobalt-based alloy. The coating layer 14 can be coated by build up welding done by, e.g., an oxy-acetylene process, a tungsten inert gas process, shielded metal arc process, plasma transferred arc process, or laser process. The coating layer may alternately be coated by thermal spraying or painting.

In FIG. 2, which is a sectional view taken along the line II-II shown in FIG. 1, a keyway 11 is provided on the lower portion of the side surface 7. The keyway 11 comprises a groove. A key 12 which is coupled with the keyway is provided on the inner surface of the main valve body 2. The key 12 comprises a projection, fitting within the keyway, which is a groove. Four sets of keys 12 and keyways 11 are coupled together to prevent the bypass valve body 3 from moving around its axis. Four sets of keys 12 and keyways 11 serve to prevent the bypass valve from moving in unexpected directions, and together with the coating layers 14 on the inner surface and the side surface 7 the keys/keyways securely support the bypass valve body 3 in the main valve body 2, even if the bypass valve is fully opened. Moreover, the surface coatings prevent wearing of side surface 8 of the bypass valve and the inner surface of the main valve body 2.

Furthermore, a plurality of grooves 15 are provided on the side surface 7 of the bypass valve body 3. The grooves 15 make it easier to release debris, which has been drawn into the gap between the inner surface and the side surface 7, to the downstream side. Therefore, binding of the inner surface of the main valve body 2 and the side surface 7 of the bypass valve body may be prevented.

Figure 3A:
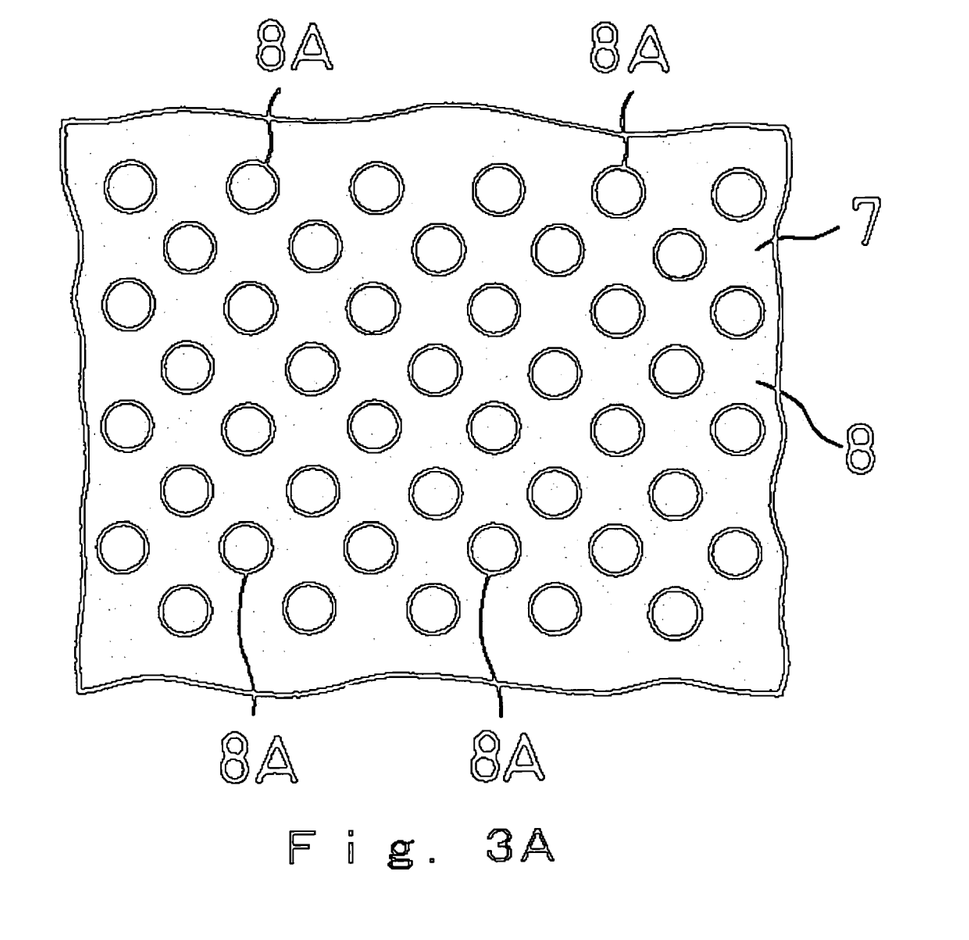
FIGS. 3A and 3B are schematic plan views of alternate arrangements for the steam inlet in accordance with the first embodiment.
Figure 3B:
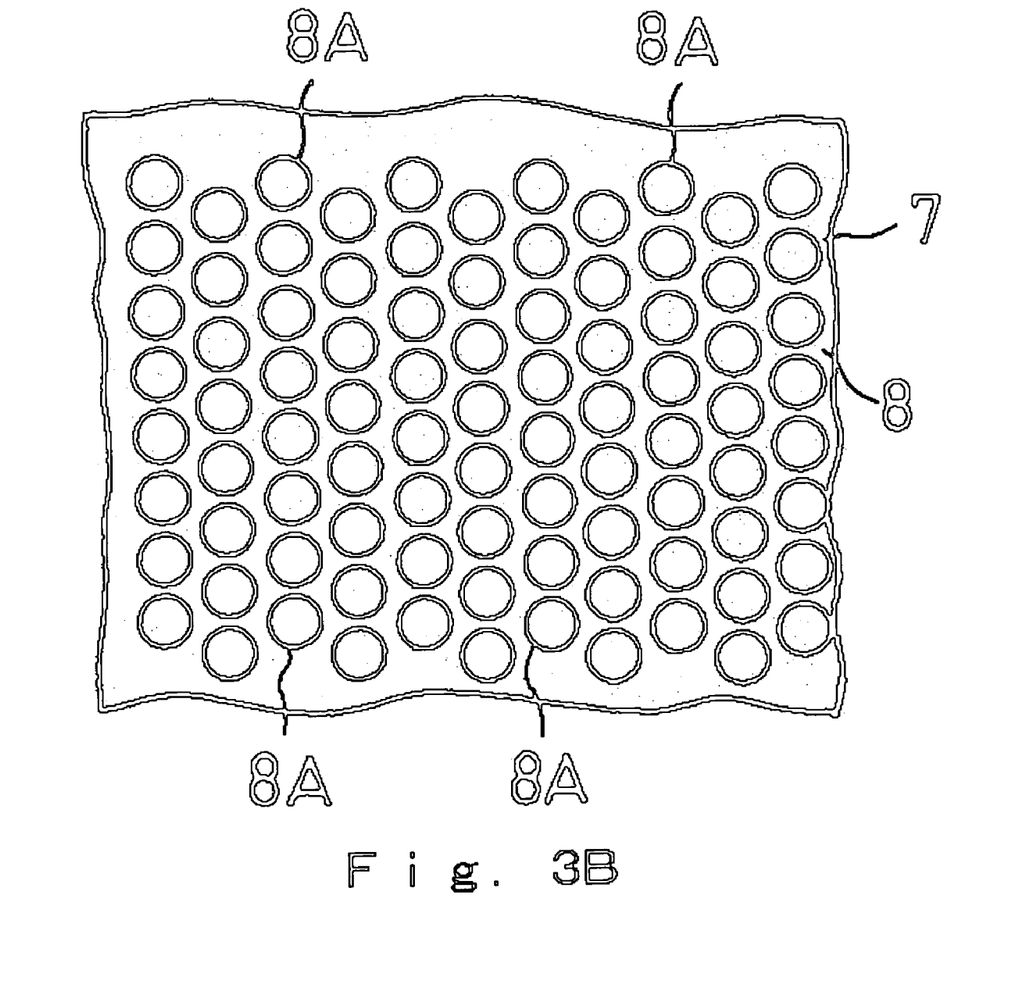

FIGS. 3A and 3B are schematic plan views of alternate designs for the steam inlet 8 in accordance in with the first embodiment. More specifically, FIGS. 3A and 3B are schematic views seen from the direction of an arrow III shown in FIG. 1.

As shown in FIG. 3A, the positions of the openings 8A in each of the inlet rows are preferably shifted from the positions of openings 8A in the next inlet row. The axial region of the openings 8A of each of the inlet row may overlap with the axial region of the openings 8A of the next inlet row, as shown in FIG. 3B.

Figure 4:
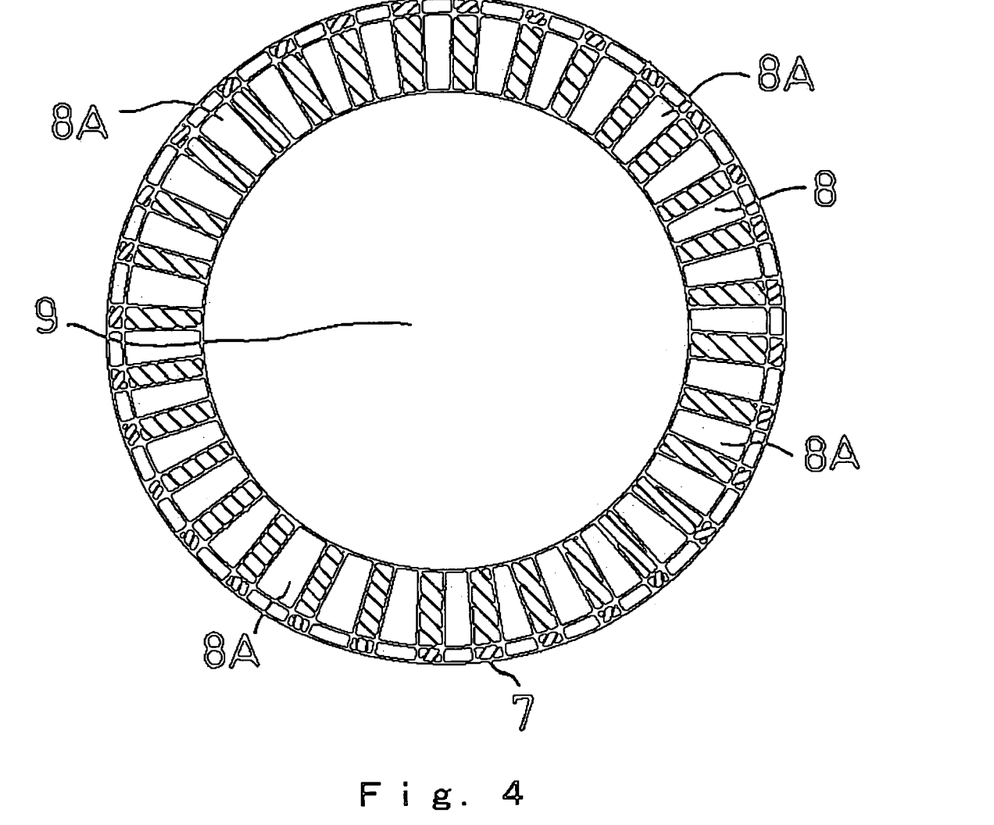
FIG. 4 is a schematic sectional view of the main steam valve, which is taken along IV-IV line shown in FIG. 1.

FIG. 4 is a schematic sectional view of the main steam valve, which is taken along line IV-IV shown in FIG. 1. Preferably, the number of the openings 8A in each of the inlet rows is an even number. As shown in FIG. 4, the openings 8A are radially symmetrically arranged inside the bypass valve about the axis, which is the center axis of the steam passageway 9. Since the openings 8A, the number of which is even, are arranged radially and symmetrically in the inlet row, there is a corresponding opening 8A located at the opposite side of each of the openings 8A. In the other words, the center axis of each of the openings 8A is common with one of the openings 8A located at the opposite side. Therefore, each of the openings 8A can introduce the steam flow 5 straight toward the center of the steam passageway 9. With this configuration, even though the main valve is shut, steam flow 5 can be introduced into the steam passageway 9 through the steam inlet 8, then to the downstream side via steam holes 10. FIG. 9 shows the state in which the bypass valve is fully opened.

The steam introduced from the steam inlet 8 goes straight toward the center of the steam passageway 9. When passing through the steam inlet 8, the steam has a high velocity; however, the kinetic energy of the steam is weakened around the center portion of the steam passageway 9, since the stream from one of the openings collides with other stream from the opening of the opposite side of the steam inlet 8. Thus, the steam in the steam passageway 9 has relatively low velocity in the horizontal direction. The steam flow 5 goes down in the steam passageway 9, recovering its pressure, and goes to the downstream side through the steam holes 10. The steam flow 5 that goes into the openings 8A may be unstable when only a part of the side surface 7 containing openings 8A is pulled out above the main valve body 2 and the rest of side surface 7 is drawn into the main valve body 2; however, the steam flow 5 is rectified (or diverted) while it passes through the openings 8A. Even in these situations, the steam flow 5 goes straight toward the center of the steam passageway 9.

The flow rate of the steam introduced into the steam passageway 9 can be controlled by adjusting an axial position of the bypass valve body 3. When the bypass valve rod 6 moves downwardly along an arrow X, the side surface 7 is drawn into the main valve body 2. Thus an area of the steam inlet 8 above the main valve body 2, which is the sum of sizes of the openings 8A of the steam inlet 8 above the main valve body 2, decreases, and the flow rate of the steam also decreases.

On the other hand, when the bypass valve rod 6 moves upwardly, the side surface 7 is pulled out from inside of the main valve body 2. Hence, the area of the steam inlet 8 above the main valve body 2, which is the sum of sizes of the openings 8A of the steam inlet 8 above the main valve body 2, increases, and the flow rate increases.

As described, because the positions of the openings 8A in each of the inlet rows are shifted circumferentially from the positions of openings 8A in the next inlet row, the openings 8A can be packed in the steam inlet 8 more densely than in the modified conventional main steam valve shown in FIGS. 9 and 10, e.g., by moving the inlet rows closer to one another. Therefore, the area of the steam inlet 8, which is the sum of the openings 8A, is increased 30% more than the modified conventional main steam valve shown in FIGS. 9 and 10. In other words, the bypass valve of this embodiment may achieve 30% more flow rate than the modified conventional main steam valve shown in FIGS. 9 and 10, for the same valve lift. Thus, the valve stroke necessary for the bypass valve is decreased, and the size of the valve can be correspondingly reduced.

Because the side surface 7 of the steam inlet 8 has a coating layer on its surface, erosion due to steam flow 5 having relatively high velocity around the openings 8A of the steam inlet may be prevented.

Further, as shown in FIG. 3B, the openings 8A of each of the inlet rows can also be overlapped to some extent in the vertical direction (one above the other) with the openings of the next inlet row. In this case, the area of the steam inlet 8, which is the sum of the openings 8A, can be further increased, i.e., by permitting less circumferential space between adjacent openings or increasing the diameter of the openings. Thus, the valve stroke necessary for the bypass valve is further decreased.

Moreover, because the openings 8A of some or preferably all of the inlet rows overlap in the axial direction with the openings of the next inlet row, a relation between the valve lift and the flow rate becomes closer to the linear characteristic. When the axial region of the inlet row of openings 8A does not overlap with the axial region of the openings 8A of the axially adjoining inlet row, the flow rate does not change around a boundary between the openings 8A of two axially adjoining inlet rows. This is less desirable for controlling flow rate. However, because the axial regions of the inlet rows 8 of the steam inlet openings, which is the sum of the openings 8A shown in FIG. 3B, axially overlap with the axially adjoining inlet row, the flow rate of the steam may be more easily controlled by adjusting the axial position of the bypass valve body 3. The shape of the openings 8A is preferably determined to achieve a linear flow characteristic. Round openings represent one preferred embodiment. Thus, while the openings 8A themselves preferably partially overlap in the horizontal (circumferential) direction, they may also or alternatively overlap in the vertical (axial) direction to at least some extent with openings 8A in the axially adjoining inlet row.

Figure 5:
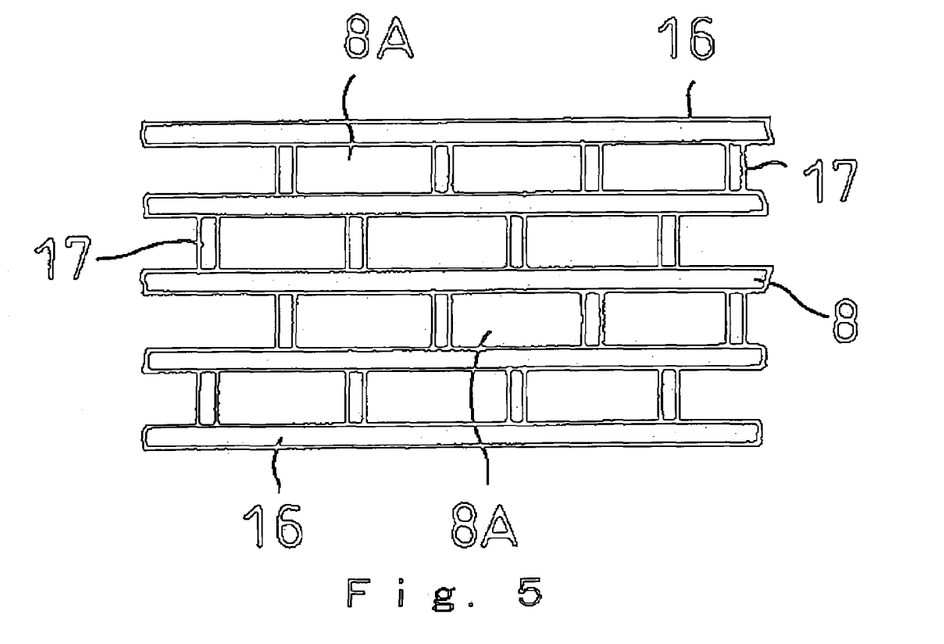
FIG. 5 is a schematic plan view of a modified steam inlet.
Figure 6:
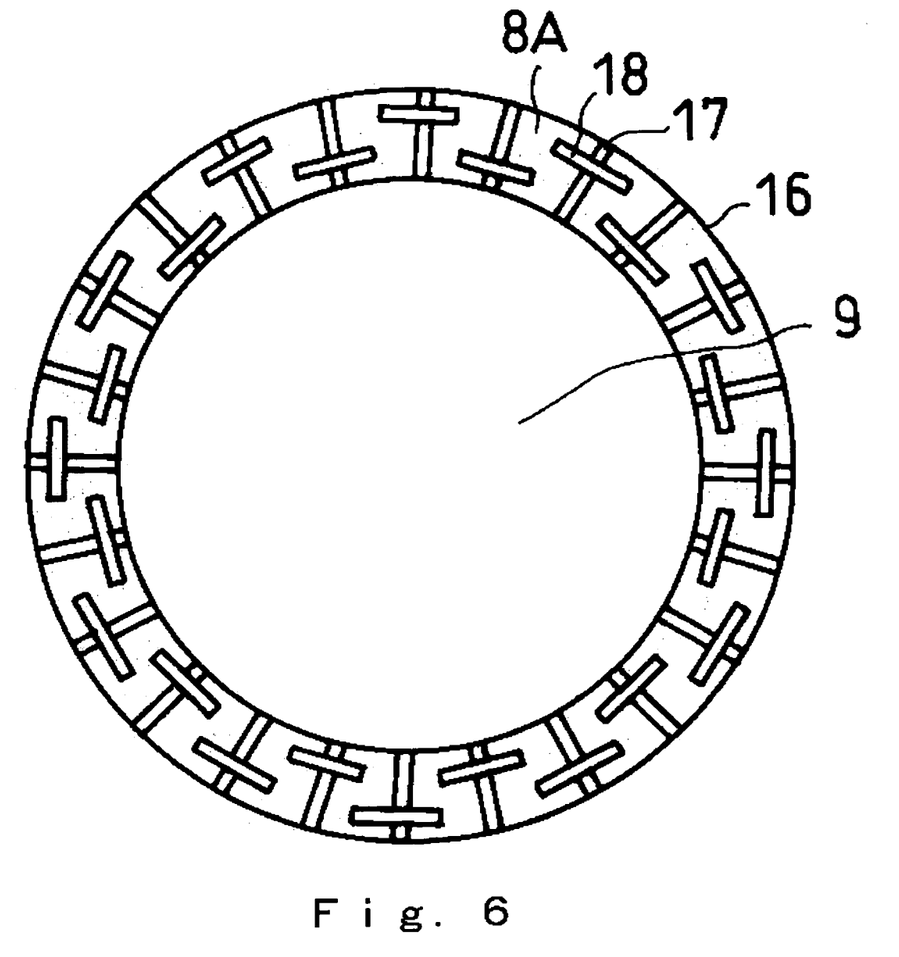
FIG. 6 is a schematic sectional view of the modified main steam valve, which is taken along IV-IV line shown in FIG. 1.

FIGS. 5 and 6 are schematic views of a modified embodiment. FIG. 5 is a schematic plan view of the modified steam inlet. Since the same reference numbers are used for the same elements shown in FIGS. 1 to 4, a detailed explanation of those elements is omitted.

As shown in FIG. 5, each of the inlet rows of the steam inlet 8 comprises two ring plates 16, and a plurality of axially extending partitions 17 provided between the ring plates 16. In other words, two axially adjoining ring plates 16 and two adjoining partitions 17 form each of the openings 8A. Steam inlet 8 may be made by welding the ring plates 16 and partitions 17. The sizes of the ring plates 16 and partitions 17 may be preferably determined based upon the strength necessary for the steam inlet 8. With this modification, the area of the steam inlet 8, which is the sum of the openings 8A, is further increased compared to the steam inlet 8 shown in FIG. 3A, and the valve stroke necessary for the bypass valve is further decreased.

FIG. 6 is a schematic sectional view of a modified version of steam inlet 8 shown in FIG. 5, taken along the line IV-IV shown in FIG. 1. In this modification, the steam inlet 8 further comprises projection plates 18, which are provided at radially intermediate points of the partition plates 17. The projection plates 18 serve to partially interrupt or block the steam flow 5 into the steam passageway 9. Therefore, the velocity of the steam introduced into the steam passageway may be further decreased. This may contribute to the prevention of erosion of the steam inlet 8. Furthermore, the velocity of the steam introduced into the steam inlet 8 is gradually decreased, and thus the noise generated during the start-up of the steam turbine may be reduced. The projection plates 18 may be provided on some or all partition plates, as needed.

FIG. 7 is a schematic graph showing a comparison of flow characteristics of several of the bypass valves described above. The horizontal axis indicates a valve lift distance, and the vertical axis indicates the flow rate of the steam. Line A indicates the flow characteristic of the conventional bypass valve shown in FIG. 8, and line B indicates the flow characteristic of the conventional bypass valve shown in FIGS. 9 and 10. On the other hand, line C indicates the flow characteristic of the bypass valve in accordance with the embodiment shown in FIG. 3A, and line D indicates the flow characteristic of the bypass valve in accordance with the modified embodiment shown in FIG. 5.

According to the inventive embodiments shown in FIGS. 1 to 6, the flow characteristic of the bypass valve is improved so that it can achieve the same flow rate of the conventional bypass valve shown in FIG. 8, but with an increased stroke that is considerably less than that of the conventional bypass valve shown in FIGS. 9-10.

The foregoing description of preferred embodiments of the invention has been presented for purposes of illustration and description. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto and that the claims encompass the disclosed embodiments and their equivalents.

What is claimed is:

1. A main steam valve for a steam turbine, comprising:
   a main valve seat;
   a main valve body having an inner surface, defining a steam passageway, and an outer surface cooperating with the main valve seat;
   a bypass valve body axially slidably provided in the steam passageway of the main valve body so that a side surface of the bypass valve slidably engages with the inner surface of the main valve body, the side surface comprising a steam inlet that comprises a plurality of inlet openings arranged along the side surface, the inlet openings arranged in rows and columns, wherein the inlet openings in each row comprise holes from every other column;

at least four keys provided in either the inner surface of the main valve or the side surface of the bypass valve;

at least four keyways, each of which mates with one of the keys, provided in the other of the inner surface of the main valve or the side surface of the bypass valve, to prevent the bypass valve from rotary movement; and at least one groove provided on the side surface of the bypass valve extending axially, the at least one groove being other than one of the keyways, wherein each row of the inlet openings is arranged along a line aligned perpendicular to an axis of the bypass valve, wherein each of the plurality of inlet openings in each row is radially symmetrically arranged in the bypass valve and oriented such that each of the openings introduces steam toward the center of the steam passageway, and wherein positions of the openings in each of the rows are circumferentially offset from the positions of openings in the next inlet row.

2. A main steam valve for a steam turbine according to claim 1, wherein the number of the openings provided in each of the rows is an even number.

3. A main steam valve for a steam turbine according to claim 1, wherein the number of the openings provided in each of the rows is the same.

4. A main steam valve for a steam turbine according to claim 1, wherein at least one of the rows of the openings at least partially overlaps axially with at least one adjacent row of the openings.

5. A main steam valve for a steam turbine according to claim 1, wherein the openings comprise generally round apertures.

6. A main steam valve for a steam turbine according to claim 1, wherein each of the rows is defined by two ring plates and a plurality of radial partitions provided between the ring plates.

7. A main steam valve for a steam turbine according to claim 6, further comprising:

a laterally extending projection plate provided at a radially intermediate position of at least some of the partitions.

8. A main steam valve for a steam turbine according to claim 1, wherein at least one of the inner surface of the main valve and the side surface of the bypass valve has a coating layer comprising a cobalt-based alloy.

9. A main steam valve for a steam turbine according to claim 8, wherein the cobalt-based alloy comprises less than or equal to 3 weight percent Ni, 28 weight percent Cr, 4 weight percent W, less than or equal to 3 weight percent Fe, 1 weight percent C, and the rest Co.

10. A main steam valve for a steam turbine according to claim 8, wherein the cobalt-based alloy comprises 2.5 weight percent Ni, 27 weight percent Cr, 5 weight percent Mo, less than or equal to 2 weight percent Fe, 0.25 weight percent C, and the rest Co.

11. In a steam turbine, including a steam generator, a turbine unit and a main steam valve positioned between the steam generator and the turbine, the main steam valve comprising a steam valve as claimed in claim 1.

12. A main steam valve for a steam turbine according to claim 1, wherein at least some openings of at least one row of openings overlap at least partially in the axial direction with openings in at least one adjacent row of openings.

13. A main steam valve for a steam turbine according to claim 1, wherein each inlet opening has a center axis common with a center axis of a corresponding opposing inlet opening.

14. A main steam valve for a steam turbine, comprising:
 a main valve seat;
 a main valve body having an inner surface, defining a steam passageway, and an outer surface cooperating with the main valve seat; and
 a bypass valve body axially slidably provided in the steam passageway of the main valve body so that a side surface of the bypass valve slidably engages with the inner surface of the main valve body, the side surface comprising a steam inlet that comprises a plurality of rows of inlet openings arranged along the side surface;
 at least four keys provided in either the inner surface of the main valve or the side surface of the bypass valve;
 at least four keyways, each of which mates with one of the keys, provided in the other of the inner surface of the main valve or the side surface of the bypass valve, to prevent the bypass valve from rotary movement; and
 at least one groove provided on the side surface of the bypass valve extending axially, the at least one groove being other than one of the keyways.

15. A main steam valve for a steam turbine according to claim 14, wherein the number of the openings provided in each of the rows is an even number.

16. A main steam valve for a steam turbine according to claim 14, wherein the number of the openings provided in each of the rows is the same.

17. A main steam valve for a steam turbine according to claim 14, wherein at least one of the rows of the openings at least partially overlaps axially with at least one adjacent row of the openings.

18. A main steam valve for a steam turbine according to claim 14, wherein the openings comprise generally round apertures.

19. A main steam valve for a steam turbine according to claim 14, wherein each of the rows is defined by two ring plates and a plurality of radial partitions provided between the ring plates.

20. A main steam valve for a steam turbine according to claim 19, further comprising:

a laterally extending projection plate provided at a radially intermediate position of at least some of the partitions.

21. A main steam valve for a steam turbine according to claim 14, wherein at least one of the inner surface of the main valve and the side surface of the bypass valve has a coating layer comprising a cobalt-based alloy.

22. In a steam turbine, including a steam generator, a turbine unit and a main steam valve positioned between the steam generator and the turbine, the main steam valve comprising a steam valve as claimed in claim 14.

23. A main steam valve for a steam turbine according to claim 14, wherein at least some openings of at least one row of openings overlap at least partially in the axial direction with openings in at least one adjacent row of openings.

* * * * *